Dec. 1, 1925.

O. A. MEYER 1,563,774

HEADLIGHT OPERATING DEVICE

Filed July 10, 1925

Inventor

Otto A. Meyer,

By Jenny R. Mathews

Attorney

Patented Dec. 1, 1925.

1,563,774

UNITED STATES PATENT OFFICE.

OTTO A. MEYER, OF WINCHESTER, INDIANA.

HEADLIGHT-OPERATING DEVICE.

Application filed July 10, 1925. Serial No. 42,723.

*To all whom it may concern:*

Be it known that I, OTTO A. MEYER, a citizen of the United States, residing at Winchester, in the county of Randolph and State of Indiana, have invented certain new and useful Improvements in Headlight-Operating Devices, of which the following is a specification.

My invention relates to an attachment for use in connection with the lever which controls the action of the headlight switch, whereby the headlights may be manipulated without the driver removing his hand from the steering wheel.

An important object of the invention is to provide a device of the above mentioned character which is extremely simple in construction, strong and durable.

Other objects and advantages of the invention will be apparent during the course of the following description.

Figure 1:
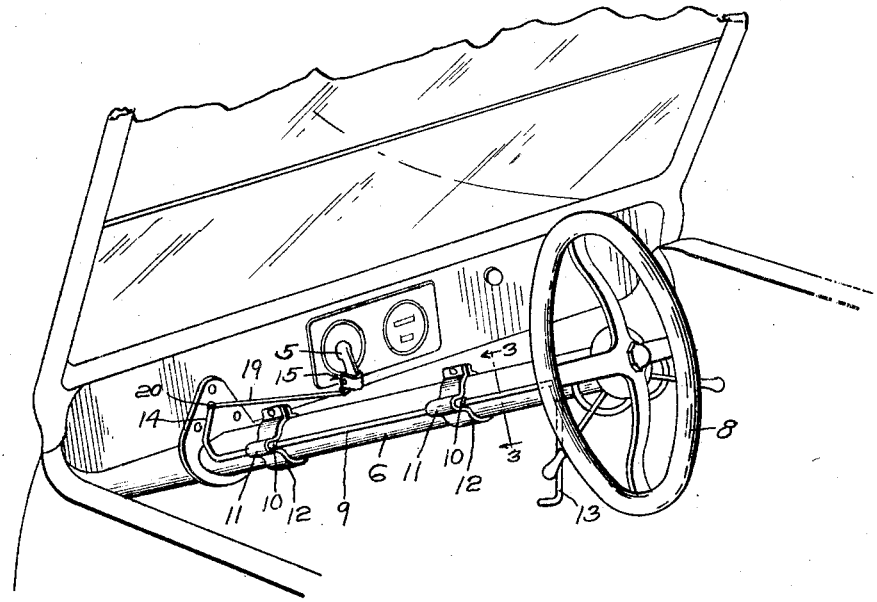
Figure 2:
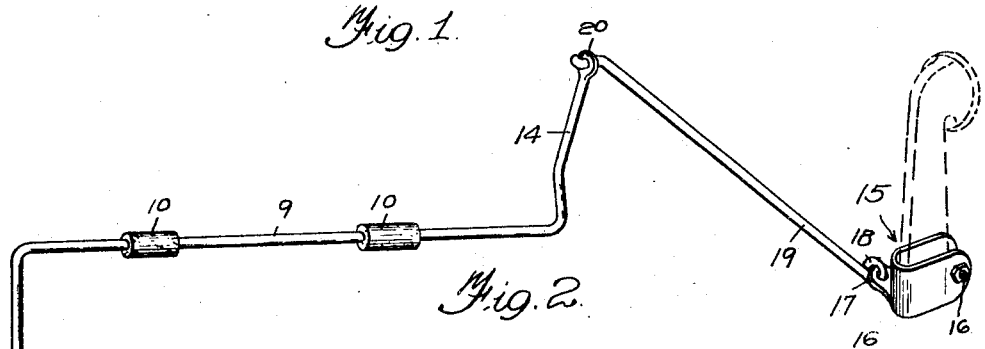
Figure 3:
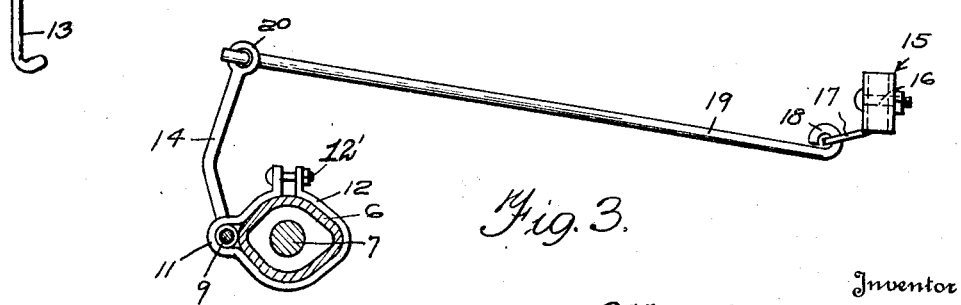

In the accompanying drawings, forming a part of this specification, and in which like numerals are employed to designate like parts throughout the same, Figure 1 is a perspective view of the device embodying my invention, showing the same in use, Figure 2 is a perspective view of the operating parts, showing the same removed from the steering column, and, Figure 3 is a horizontal section taken on line 3—3 of Figure 1.

In the drawings, wherein for the purpose of illustration is shown a preferred embodiment of my invention, the numeral 5 designates the shifting lever of a switch, which controls the headlights of the automobile, rendering them dim, bright or extinguished. This is the type of switch ordinarly employed upon the Ford automobile. The Ford automobile also embodies a stationary housing 6, within which is rotatably mounted the steering column 7, carrying the steering wheel 8 at its upper end. This is the usual Ford construction.

My attachment or invention embodies a rock shaft 9, extending longitudinally of the steering column 6, and carrying rubber sleeves 10, as shown. These rubber sleeves are held within outwardly bulging pockets 11, formed upon clamps 12, adapted to surround the steering column, and having their free ends connected by bolts 12', Figure 3. The rubber sleeves are held within the pockets of the clamps and permit of a turning action of the rock shaft but prevent rattling. At its upper end, the rock shaft is provided with a radial extension or arm 13, disposed beneath and near the steering wheel 8, so that the same may be shifted in either direction, without the operator releasing the steering wheel. The rock shaft 9 is shown as disposed upon the side of the steering column, and if so arranged, the usual horn button which is positioned upon this side of the steering column, would have to be shifted to the top, bottom or opposite side of the steering column. At its lower end, the rock shaft 9 is equipped with a radial crank 14, which projects forwardly and above the steering column housing 6, as shown.

The numeral 15 designates a U-shaped clamp, adapted to receive the free end of the switch lever 5 and to be clamped thereon by a transverse bolt 16. This clamp carries a lateral projection 17, preferably integral therewith, and which projection is apertured for receiving an eye 18, formed upon a connecting rod 19. The rod 19 has its inner end offset and pivotally connected within an eye 20, formed upon the free end of the crank 14.

In view of the foregoing description, it is thus seen that by turning the arm 13 in either direction, the switch lever 5 will be turned in the corresponding direction, for actuating the headlights. The arm 13 may be manipulated with convenience by the driver, without releasing the steering wheel, since the arm is arranged beneath and in close relation to the steering wheel.

It is to be understood that the form of my invention herewith shown and described is to be taken as a preferred example of the same, and that various changes in the shape, size and arrangement of parts may be resorted to without departing from the spirit of my invention or the scope of the subjoined claim.

Having thus described my invention, I claim:

The combination with the steering column of an automobile, of split adjustable clamps carried thereby, each clamp being provided in its side with an outwardly bulging pocket having its inner side open, adjustable means to contract each split clamp, a rock shaft entering through the pockets, rubber sleeves carried by the rock shaft and located within the pockets and arranged to contact with the steering column, the friction upon the sleeves being regulated by adjusting the tension of the split clamps, a crank connected with the lower end of the rock shaft, means connecting the crank with the automobile instrument, and a second crank connected with the upper end of the rock shaft and arranged near the steering wheel.

In testimony whereof I affix my signature.

OTTO A. MEYER.